Jan. 25, 1955     H. WOLFE     2,700,248

EYE FOR DOLLS

Filed July 3, 1952

*INVENTOR.*
HOWARD WOLFE
BY *James and Franklin*
ATTORNEYS

United States Patent Office 2,700,248
Patented Jan. 25, 1955

2,700,248

EYE FOR DOLLS

Howard Wolfe, Harrington Park, N. J., assignor to Margon Corporation, Bayonne, N. J., a corporation of New Jersey Application July 3, 1952, Serial No. 297,117

12 Claims. (Cl. 46—169)

The invention relates to movable eyes for dolls' heads, and more particularly to improved means for pivotally or oscillatably mounting the eyes for sleeping action.

Sleeping eye mechanisms for dolls generally consist of an eye member, a weight member connected thereto, and means for pivotally or oscillatably supporting the eye member so that when the doll is moved from an upright to a supine position, the eye will appear to close. One of the most common means for pivotally mounting an eye, particularly of the individual or unit assembly type, is to pass a separate shaft or pin through diametrically opposite apertures formed in the eye member so that the protruding ends of the shaft will provide trunnions which may be received in bearings provided by the doll's head itself, or in bearings provided by a housing for the eye, which housing is immovably mounted within the eye socket of the doll's head, or is inserted later.

A second known method, when pivotally mounting the eye member in a housing, is to pierce or dimple the housing to provide inwardly directed trunnions which are received within apertures or bearings provided by the eye member. This method is difficult to control in production, because the piercing or dimpling is done blindly into the aperture of the inner member. Moreover, it is difficult to maintain the close dimensional tolerances necessary to provide accurate, free pivotal action. Also, this type of pivotal mounting is not usable where the eye mechanism is to be mounted directly in the doll's head, without an intermediate housing.

In accordance with a feature and object of the present invention, the need for a separate shaft or pin, or for piercing or dimpling the outer housing into apertures formed in the eye member, is obviated.

The foregoing general object is accomplished by providing the anyway essential weight member, with integrally formed means for pivotally mounting the eye member, so that upon mere assembly of the eye and weight member, the eye is provided with pivotal mounting means, specifically trunnions, thereby preparing the assembly for mounting in an eye socket of a doll, or within a housing which, in turn, is to be mounted in an eye socket. Moreover, the weight member preferably is formed for simple and quick assembly in proper relation with the eye member, so that upon quick and ready assembly of the two elements, the means or trunnions for pivotally mounting the eye member are properly located.

These and other objects and advantages of the invention will be apparent from the following detailed description, taken with the accompanying drawings wherein.

Figure 1:
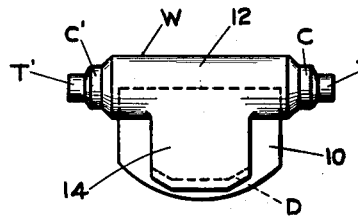
Fig. 1 is a front elevation of a weight member made in accordance with the present invention.
Figure 2:
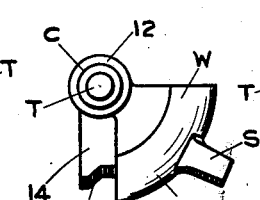
Fig. 2 is a side elevation of the weight member.
Figure 3:
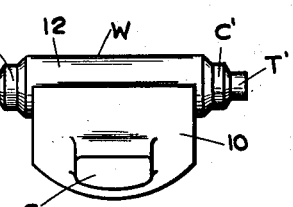
Fig. 3 is a rear view of the weight member.
Figure 4:
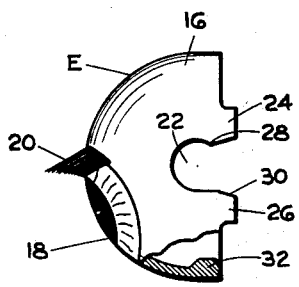
Fig. 4 is a side elevation, partially in section, of an eye member formed to receive the weight member shown in Figs. 1 to 3.
Figure 8:
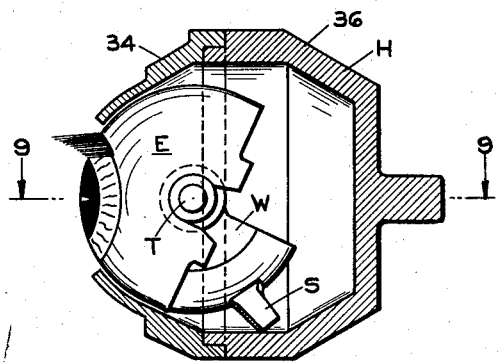
Fig. 8 is a vertical section taken approximately in the plane of line 8—8 of Fig. 9, showing the assembled eye and weight members pivotally mounted within a housing.
Figure 9:
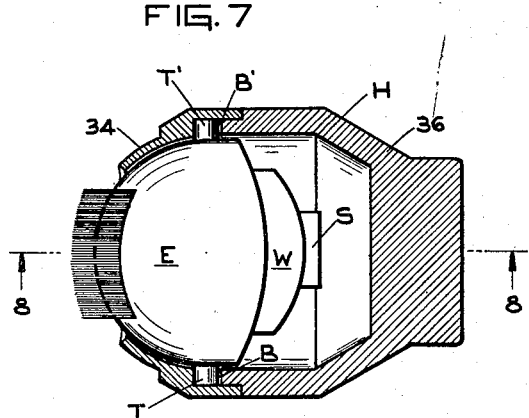
Fig. 9 is a horizontal section taken approximately in the plane of line 9—9 of Fig. 8.

Referring to the drawing, the eye member is a generally hemispherical hollow shell shown in Fig. 4. The weight for the eye is shown in Figs. 1, 2 and 3, and is provided with means for pivotally mounting same, more specifically the trunnions T and T'. The weight and eye are readily secured together, preferably with a snap engagement, as shown by the change from Fig. 5 to Fig. 6, whereupon the trunnions of the weight become the trunnions of the eye, and are properly located in relation to the curvature of the eye. Figs. 8 and 9 show how the eye may be mounted in a housing, the trunnions then being received in bearings formed at the sides of the housing, as shown in Fig. 9.

The weight member W preferably is formed by molding the same of a suitable material having sufficient mass. The weight may be die-cast metal, or if desired, may be molded from a plastic composition which preferably contains a weight-imparting filler. In the preferred form of the invention, the means for pivotally mounting the eye member takes the form of integrally formed trunnions T, T' which extend outwardly on opposite sides of the weight member. The weight member W is also formed with means C, C' and D for simply and effectively connecting the weight member to the eye member. Additionally, the weight member W preferably is molded to provide a stop S to limit the amount of movement of the eye member.

In the illustrated form of the invention the weight member W comprises a sector-shaped body portion 10 having integrally formed therewith a substantially cylindrical part 12 extending across the top thereof and along the front of the piece, that is, along the axis of the sector. The trunnions T and T' are circular in cross section, and of a diameter selected to fit with only a small amount of clearance in the spaced bearings within which they are to be journalled. The eye member connecting portions C and C' are formed as a pair of cylindrical sections each located intermediate the part 12 and an adjoining trunnion. The connecting portions C and C' have a diameter somewhat greater than the diameters of the trunnions. The other eye member connecting portion D is formed as an undercut located below the part 12. This undercut portion is formed at the bottom of a boss 14 formed integrally at the front of the main body portion 10 and beneath part 12.

The eye member E shown in Figs. 4 to 7 comprises a substantially hemispherical hollow shell 16 open towards the rear, and is provided at the front thereof with a lens portion 18 which is formed to simulate the iris and pupil. The eye member E may be slotted to receive an eyelash 20. Also, as is common practice in the art, the eye member may be flesh colored above the eyelash to simulate an eyelid.

The eye member E may be made in any suitable fashion. Preferably, the eye shell 16 and the lens portion 18 are integrally molded in one piece from a suitable plastic composition. However, the eye shell and lens portion may be separately molded of plastic material and secured to each other. If desired, the eye shell 16 may be made of metal, and a separate plastic lens secured therein, as generally described in Marcus Patent No. 2,254,232, granted September 2, 1941. Also, instead of providing a plastic lens for a metal eye shell, the entire eye member may be made of metal, and the pupil, iris and eyelid may be simulated by printing directly on the metal.

The described eye member differs from conventional constructions in that it is formed in a manner to facilitate assembly with the weight member W. The eye member E is formed at diametrically opposite sides with cutouts or slots 22 designed to receive in snug engagement the connecting portions C and C' formed on the weight member. The slots 22 open towards the rear of the eye member, and circumscribe slightly more than a semi-circle. A pair of ears 24 and 26 are located above and below, and adjacent each slot 22. The ears 24 are formed to provide small obstructions 28 where they intersect the slots. The ears 26 are formed to provide ways 30 for guiding the connecting portions C and C' of the weight member into their respective slots. The eye member also is provided with a bead or rib 32 extending for a short segment along the bottom and inside periphery of the eye member, to cooperatingly engage and receive the previously described undercut portion D of the weight member.

Figure 5:
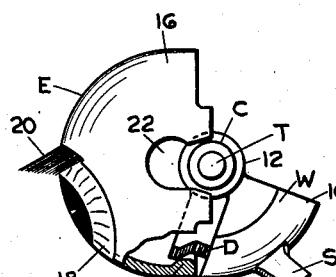
Fig. 5 is also a side elevation, partially in section, illustrating the process of assembling the eye and weight members.
Figure 6:
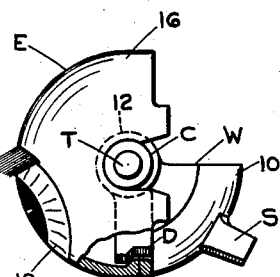
Fig. 6 is a view similar to Fig. 5, showing the members assembled.
Figure 7:
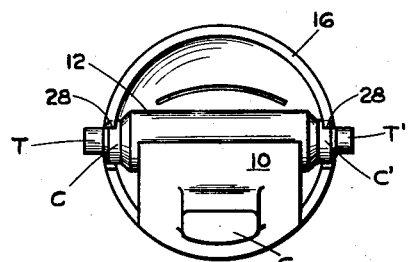
Fig. 7 is a rear view of the assembly shown in Fig. 6.

As shown in Fig. 5, the weight member W is assembled with the eye member E by placing the undercut portion D over the rib 32 and sliding the portions C, C' over the ways 30 until they snap past the small obstructions 28 and into the slots 22 with a snug fit. The diameters of the portions C, C' and the slots 22 are substantially the same, and the lengths of portions C and C' are substantially the same as the thickness of the shell 16, so that the ends of section 12 abut against the inside of the shell. The resulting assembly shown in Figs. 6 and 7 comprises the eye and weight members securely connected to each other, with the trunnions T and T' projecting outwardly from the eye member. The assembly is now ready for pivotal mounting in spaced bearings formed either directly in an eye socket of a doll's head, or in a housing which is to be mounted within an eye socket.

In the illustrated form of the invention, the described assembly is pivotally mounted in a housing H (Figs. 8 and 9) provided with spaced bearings B and B' which receive the trunnions T and T'. The particular housing shown is of the type described in detail in a co-pending application of Wolfe and Samolewitz, Serial No. 224,351, filed May 3, 1951, and having the same assignee as the present invention. This housing comprises two elements 34 and 36, one of which is formed with open bearings, and the other of which upon assembly of the two housing members closes off the bearings. This assembly is especially suitable for use in flexible dolls' heads. As will be observed in Fig. 8, when the eye is in open or non-sleeping position the stop S engages a part of the housing H such that the lens portion of the eye member is in alignment with the eye opening provided in the front of the housing.

It is believed that the construction of the described weight member with its integrally formed trunnions for pivotally mounting the eye member, and the simple means provided for assembling the eye and weight members, as well as the advantages thereof, particularly when mounted in a housing intended to be inserted in the socket of a flexible doll's head, will be apparent from the foregoing detailed description. It also will be apparent that while a preferred form of the invention has been shown and described, changes may be made in the structure disclosed without departing from the scope of the invention as sought to be defined in the following claims.

I claim:

1. An individual sleeping eye mechanism for dolls comprising a substantially hemispherical hollow eye member open towards the rear, a separate weight member, cooperating means provided by said eye and weight members for connecting said members with a snap-fit, a portion of the weight member being received within the eye member at the rear thereof, a housing for said eye member, said eye member being pivotally mounted within said housing by mating trunnions and bearings provided by the housing and the weight member.

2. An individual sleeping eye mechanism for dolls comprising a substantially hemispherical hollow eye member open towards the rear, a separate weight member, cooperating means provided by said eye and weight members for connecting said members with a snap-fit, a portion of the weight member being received within the eye member at the rear thereof, a housing for said eye member, said eye member being pivotally mounted within said housing by outwardly extending trunnions formed integrally with said weight member received within bearings provided by the housing.

3. An individual sleeping eye mechanism for dolls comprising a plastic, substantially semi-spherical hollow eye member open towards the rear, a pair of slots located at diametrically opposite sides of the eye member and open towards the rear, a rib formed along a portion of the periphery of the eye member, a separate molded weight member, said weight member being formed with portions to cooperatingly engage said slots and rib to thereby connect said eye and weight members with a portion of the weight member received within the eye member at the rear thereof, a housing for said eye member, said eye member being pivotally mounted within said housing by trunnions extending outwardly of said slots and formed integrally with said weight member received within bearings provided by the housing.

4. An individual sleeping eye comprising a substantially hemispherical hollow eye member open towards the rear, and a separate weight member connected to and localized at said eye member immediately at the rear thereof, said weight member having a portion thereof received within said eye member and connected thereto, and means for pivotally mounting said eye member, said means being provided by trunnions formed integrally with said weight member and extending outwardly from opposite sides thereof on opopsite sides of said eye member.

5. An individual sleeping eye comprising a substantially hemispherical hollow eye member open towards the rear, a separate weight member localized at said eye member immediately at the rear thereof, cooperating means provided by said eye and weight members for connecting said members with a snap-fit, a portion of the weight member being received within the eye member at the rear thereof, and means for pivotally mounting said eye, said means being provided by outwardly extending trunnions formed integrally with said weight member.

6. An individual sleeping eye comprising a substantially semi-spherical hollow eye member open towards the rear, a pair of slots located at diametrically opposite sides of the eye member and open towards the rear, a rib formed along a portion of the periphery of the eye member, a separate molded weight member localized at said eye member immediately at the rear thereof, said weight member being formed with portions to cooperatingly engage said slots and rib to thereby connect said eye and weight member with a portion of the weight member received within the eye member at the rear thereof, and means for pivotally mounting said eye, said means being provided by trunnions extending outwardly of said slots and formed integrally with said weight member at substantially diametrically opposite sides of said eye member.

7. A weight member for use with a substantially hemispherical eye member which has slots at its rear side edges, said weight member to be connected to and localized at said eye member immediately at the rear thereof, said weight member having integrally formed outwardly projecting trunnions, and portions of said weight member extending in diametrically opposite directions on an axis which is to coincide with the axis of the eye member, said portions being located inwardly of and coaxial with said trunnions, said weight member being so stepped between said trunnions and said portions that the portions are of larger cross-section than the trunnions, said portions being dimensioned to be received in said slots at the rear side edges of the eye member, and the trunnions being adapted to be received in bearings for pivotally mounting the combined eye and weight members for movement in unison.

8. An individual sleeping eye comprising a substantially hemispherical eye member, and a separate weight member connected to and localized at said eye member immediately at the rear thereof, said weight member having integrally formed outwardly projecting trunnions extending in diametrically opposite directions on the axis of the eye member, and portions of said weight member formed integrally therewith and located inwardly of said trunnions, said portions being received in slots formed at the rear edges of the sides of the eye member, and said trunnions being adapted to be received in bearings for pivotally mounting the combined eye and weight members for movement in unison.

9. An individual sleeping eye comprising a substantially hemispherical eye member, and a separate weight member connected to and localized at said eye member immediately at the rear thereof, said weight member having integrally formed outwardly projecting trunnions and adjacent portions extending in diametrically opposite directions on the axis of the eye member, said adjacent portions being located inwardly of and coaxial with said trunnions, said weight member being so stepped between said trunnions and said adjacent portions that the adjacent portions are of larger cross-section than the trunnions, said adjacent portions being received in mating slots formed at the rear edges of the sides of the eye member, and the trunnions being adapted to be received in bearings for pivotally mounting the combined eye and weight members for movement in unison.

10. An individual sleeping eye mechanism for dolls, comprising a substantially hemispherical eye member, a separate weight member connected to and localized at said eye member immediately at the rear thereof, and a housing for the eye member and weight member, said weight member having integrally formed outwardly projecting trunnions extending in diametrically opposite directions on the axis of the eye member, and portions formed integrally with and located inwardly of said trunnions, said portions being received in slots formed at the rear edges of the sides of the eye member, and the trunnions being received in bearings provided in the housing for pivotally mounting the combined eye and weight members for movement in unison within the housing.

11. An individual sleeping eye mechanism for dolls, comprising a substantially hemispherical eye member, a separate weight member connected to and localized at said eye member immediately at the rear thereof, and a housing for the eye member and weight member, said weight member having integrally formed outwardly projecting trunnions and adjacent portions extending in diametrically opposite directions on the axis of the eye member, said adjacent portions being located inwardly of and coaxially with said trunnions, said weight member being so stepped between said trunnions and said adjacent portions that the adjacent portions are of larger cross-section than the trunnions, said adjacent portions being received in mating slots formed at the rear edges of the sides of the eye member, and said trunnions being received in bearings provided in the housing for pivotally mounting the combined eye and weight members for movement in unison within the housing.

12. An individual sleeping eye mechanism for dolls, comprising a substantially hemispherical eye member, a separate weight member connected to and localized at said eye member immediately at the rear thereof, and a housing for the eye member and weight member, said weight member having integrally formed outwardly projecting trunnions and adjacent portions extending in diametrically opposite directions on the axis of the eye member, said adjacent portions being located inwardly of and coaxial with said trunnions, said weight member being so stepped between said trunnions and said adjacent portions that the adjacent portions are of larger cross-section than the trunnions, said adjacent portions being received in mating slots formed at the rear edges of the sides of the eye member, and said trunnions being received in bearings provided in the housing for pivotally mounting the combined eye and weight members for movement in unison within the housing, and said weight member having a projecting stop member to limit the opening movement of the eye member by bearing against the bottom of the housing when the eye is in open position.

References Cited in the file of this patent

UNITED STATES PATENTS

| Number | Name | Date |
|---|---|---|
| 1,177,393 | Denivelle | Mar. 28, 1916 |
| 1,856,538 | Case | May 3, 1932 |
| 2,035,081 | Lower | Mar. 24, 1936 |
| 2,039,928 | Popovich | May 5, 1936 |
| 2,160,982 | Paganello | June 6, 1939 |
| 2,546,682 | Wilhelm | Mar. 27, 1951 |
| 2,601,742 | Kusold | July 1, 1952 |
| 2,618,898 | Wilhelm | Nov. 25, 1952 |